United States Patent
Davis et al.

(10) Patent No.: US 6,782,150 B2
(45) Date of Patent: Aug. 24, 2004

(54) APPARATUS FOR SENSING FLUID IN A PIPE

(75) Inventors: Allen R. Davis, Falls Church, VA (US); Daniel L. Gysling, Glastonbury, CT (US); Charles R. Winston, Glastonbury, CT (US); John M. Faustino, East Haven, CT (US); Rebecca S. McGuinn, Middlefield, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 149 days.

(21) Appl. No.: 09/740,760

(22) Filed: Nov. 29, 2000

(65) Prior Publication Data

US 2002/0064331 A1 May 30, 2002

(51) Int. Cl.[7] .............................................. G02B 6/00
(52) U.S. Cl. .................... 385/12; 385/13; 73/170.01; 73/170.06; 73/170.11; 73/170.13; 73/170.14; 73/152.51; 73/861.18; 73/861.23
(58) Field of Search ................. 385/12, 13; 73/170.01, 73/170.06, 170.11, 170.13, 170.14, 152.51, 861.18, 861.23

(56) References Cited

U.S. PATENT DOCUMENTS

| | | | |
|---|---|---|---|
| 3,149,492 A | * | 9/1964 | Weinberg .................... 73/393 |
| 3,851,521 A | | 12/1974 | Ottenstein |
| 4,080,837 A | * | 3/1978 | Alexander et al. .......... 73/61 R |
| 4,114,439 A | | 9/1978 | Fick |
| 4,144,768 A | | 3/1979 | Andersson |
| 4,159,646 A | | 7/1979 | Paulsen |
| 4,164,865 A | | 8/1979 | Hall |
| 4,236,406 A | | 12/1980 | Reed |
| 4,275,602 A | | 6/1981 | Fujishiro |
| 4,445,389 A | * | 5/1984 | Potzick et al. ........... 73/861.27 |
| 4,499,418 A | | 2/1985 | Helms |
| 4,515,473 A | * | 5/1985 | Mermelstein ................ 356/33 |
| 4,520,320 A | * | 5/1985 | Potzick et al. .............. 328/133 |

(List continued on next page.)

FOREIGN PATENT DOCUMENTS

| | | | |
|---|---|---|---|
| DE | 19511234 | 12/1995 | |
| EP | 0684458 | 5/1995 | |
| FR | 2 357 868 | 7/1976 | |
| GB | WO 00/00793 | 1/2000 | ............. G01F/1/74 |
| JP | 406082281 | 3/1994 | |
| WO | WO 93/14382 | 7/1993 | |
| WO | WO 96/04528 | 2/1996 | |
| WO | WO 00/00793 | 1/2000 | |

OTHER PUBLICATIONS

International search Report dated Mar. 11, 2002 for corresponding application PCT GB01/05283.

(List continued on next page.)

Primary Examiner—Robert H. Kim
Assistant Examiner—George Y. Wang
(74) Attorney, Agent, or Firm—Moser, Patterson & Sheridan, L.L.P.

(57) ABSTRACT

An apparatus for non-intrusively sensing fluid flow within a pipe is provided. The apparatus includes a first sensing array for sensing acoustic signals traveling at the speed of sound through fluid flow within the pipe, a second sensing array for sensing local pressure variations traveling with the fluid flow, and a housing attached to the pipe for enclosing the sensing arrays. The first sensing array includes a plurality of first optical pressure sensors and the second sensing array includes a plurality of second optical pressure sensors.

38 Claims, 3 Drawing Sheets

U.S. PATENT DOCUMENTS

| | | | |
|---|---|---|---|
| 4,546,649 A | | 10/1985 | Kantor |
| 4,706,501 A | * | 11/1987 | Atkinson et al. ............. 73/730 |
| 4,788,852 A | | 12/1988 | Martin |
| 4,813,270 A | | 3/1989 | Baillie |
| 4,862,750 A | | 9/1989 | Nice |
| 4,864,868 A | | 9/1989 | Khalifa |
| 4,884,457 A | | 12/1989 | Hatton |
| 4,896,540 A | * | 1/1990 | Shakkottai et al. ...... 73/861.02 |
| 4,932,262 A | * | 6/1990 | Wlodarczyk ........... 250/227.23 |
| 4,947,127 A | | 8/1990 | Helms |
| 4,950,883 A | * | 8/1990 | Glenn ................... 250/277.14 |
| 4,976,151 A | * | 12/1990 | Morishita .................... 73/730 |
| 4,996,419 A | * | 2/1991 | Morey ................... 250/277.18 |
| 5,024,099 A | * | 6/1991 | Lee ............................. 73/730 |
| 5,031,460 A | * | 7/1991 | Kanenobu et al. ............ 73/730 |
| 5,040,415 A | * | 8/1991 | Barkhoudarian ............. 73/198 |
| 5,051,922 A | | 9/1991 | Toral |
| 5,058,437 A | | 10/1991 | Chaumont et al. ....... 73/861.21 |
| 5,083,452 A | * | 1/1992 | Hope ......................... 73/61 R |
| 5,099,697 A | | 3/1992 | Agar |
| 5,115,670 A | | 5/1992 | Shen |
| 5,152,181 A | | 10/1992 | Lew |
| 5,207,107 A | | 5/1993 | Wolf |
| 5,218,197 A | * | 6/1993 | Carroll ................... 250/227.19 |
| 5,317,576 A | * | 5/1994 | Leonberger et al. ........... 372/6 |
| 5,321,991 A | | 6/1994 | Kalotay |
| 5,347,873 A | | 9/1994 | Vander Heyden |
| 5,361,130 A | * | 11/1994 | Kersey et al. ............... 356/345 |
| 5,363,342 A | * | 11/1994 | Layton et al. ............... 367/149 |
| 5,367,911 A | * | 11/1994 | Jewell et al. ............ 73/861.08 |
| 5,372,046 A | | 12/1994 | Kleven |
| 5,398,542 A | * | 3/1995 | Vasbinder .................... 73/40.5 |
| 5,401,956 A | * | 3/1995 | Dunphy et al. ......... 250/277.18 |
| 5,426,297 A | * | 6/1995 | Dunphy et al. ......... 250/277.23 |
| 5,440,932 A | * | 8/1995 | Wareham ...................... 73/730 |
| 5,493,390 A | * | 2/1996 | Varasi et al. ................... 356/32 |
| 5,493,512 A | | 2/1996 | Peube |
| 5,513,913 A | * | 5/1996 | Ball et al. .................... 374/120 |
| 5,564,832 A | * | 10/1996 | Ball et al. .................... 374/161 |
| 5,576,497 A | | 11/1996 | Vignos |
| 5,591,922 A | * | 1/1997 | Segeral et al. ........... 73/861.04 |
| 5,597,961 A | | 1/1997 | Marrelli |
| 5,639,667 A | | 6/1997 | Heslot |
| 5,642,098 A | | 6/1997 | Santa Maria et al. |
| 5,644,093 A | | 7/1997 | Wright |
| 5,654,551 A | | 8/1997 | Watt |
| 5,670,720 A | * | 9/1997 | Clark et al. .................... 73/730 |
| 5,680,489 A | * | 10/1997 | Kersey ......................... 385/12 |
| 5,689,540 A | | 11/1997 | Stephenson |
| 5,708,211 A | * | 1/1998 | Jepson et al. ............ 73/861.04 |
| 5,730,219 A | | 3/1998 | Tubel |
| 5,732,776 A | | 3/1998 | Tubel |
| 5,741,980 A | * | 4/1998 | Hill et al. ................. 73/861.04 |
| 5,803,167 A | | 9/1998 | Bussear |
| 5,804,713 A | | 9/1998 | Kluth |
| 5,842,347 A | | 12/1998 | Kinder |
| 5,845,033 A | * | 12/1998 | Berthold et al. .............. 385/12 |
| 5,906,238 A | | 5/1999 | Carmody |
| 5,907,104 A | | 5/1999 | Cage |
| 5,908,990 A | | 6/1999 | Cummings |
| 5,925,821 A | | 7/1999 | Bousquet |
| 5,925,879 A | | 7/1999 | Hay |
| 5,939,643 A | | 8/1999 | Oertel |
| 5,956,132 A | | 9/1999 | Donzier |
| 5,959,547 A | | 9/1999 | Tubel |
| 5,963,880 A | | 10/1999 | Smith |
| 5,975,204 A | | 11/1999 | Tubel |
| 5,992,519 A | | 11/1999 | Ramakrishnan |
| 5,996,690 A | | 12/1999 | Shaw |
| 6,002,985 A | | 12/1999 | Stephenson |
| 6,003,383 A | | 12/1999 | Zielinska |
| 6,003,385 A | | 12/1999 | De Vanssay |
| 6,009,216 A | | 12/1999 | Pruett |
| 6,016,702 A | | 1/2000 | Maron |
| 6,158,288 A | | 12/2000 | Smith |
| 6,216,532 B1 | | 4/2001 | Stephenson |
| 6,233,374 B1 | | 5/2001 | Ogle et al. |
| 6,279,660 B1 | | 8/2001 | Hay |
| 6,354,147 B1 | | 3/2002 | Gysling et al. |

OTHER PUBLICATIONS

"Noiser and Vibration Control Engineering Principles and Applications", Leo L. Beranek and Istvan L. Ver, A Wiley Interscience Publication, pp. 537–541.

"Mandrel–Wound Fiber Optic Pressure Sensor", P. Ogle and D. Gysling, United States Serial No. 09/326,097 filed Jun. 4, 1999 (Docket CC–0067), pp. 1–26 with 4 sheets of drawings.

"Fiber Optic Sensors for Navy Applications", by A. Dandridge & G.B. Cogdell, IEE, Feb. 1991.

"Multiplexed fiber Bragg grating strain–sensor system with a fiber Fabry–Perot wavelength filter", by A. D. Kersey et al, Optics Letters, vol. 18, No. 16, Aug. 1993.

"A review of recent development in Fiber Optic Sensor Technology", by A. Kersey, SPIE, vol. 1586 Distributed and Multiplexed Fiber Optic Sensors (1991).

"Sound and Sources of Sound", by A.P. Dowling and J.E. Williams, pp. 224–229.

"Speed and Flow Measurement by an Intelligent Correlation System" by Franz Mesch, Advances in Instrumentation and Control, 45(1990) Part 4. Research Triangle Park, NC, US.

Mesch, F. (1990) "Speed and Flow Measurement by an Intelligent Correlation System", Advances in Instrumentation and Control, Research Triangle Park, NC, Part 4, p. 1899–1914.

Specification for US patent application Ser. No. 09/346, 607, filed Jul. 2, 1999, Attorney docket: WEAF:057.

Specification for US patent application Ser. No. 09/345827, filed Jul. 2, 1999, Attorney docket: WEAF:060.

Specification for US patent application Ser. No. 09/346,604, filed Jul. 2, 1999, Attorney docket: WEAF:072.

Specification for US patent application Ser. No. 09/344,069, filed Jun. 25, 1999, Attorney docket: WEAF:106.

Specification for US patent application Ser. No. 09/519,785, filed Mar. 7, 2000, Attorney docket: WEAF:061.

Specification for US patent application Ser. No. 09/346,606, filed Jul. 2, 1999, Attorney docket: WEAF:071.

Specification for US patent application Ser. No. 09/346,605, filed Jul. 2, 1999, Attorney docket: WEAF:078.

Gysling, D (1999) "Development of a Fiber Optic Downhole Multiphase Flow Meter", in "Field Application & New Technologies for Multiphase Metering", Multiphase Technology Series Conference, Aberdeen, Scotland.

Beranek, L. and Ver, 1. (1992) in "Noise and Vibration Control Engineering, Principles and Application", John Wiley & Sons, Inc., Chapter 14, p:537–541.

Dowling, A. and Williams, J. in "Sound and Sources of Sound", Ellis Horwood Limited, Section 4, p:79–80.

Kersey, A. et al. (1993) "Multiplexed Fiber Bragg Grating Strain–Sensor System with a Fiber Fabry–Perot Wavelength Filter", Optics Letters, 18:1370–1372.

Dandridge, A. & Cogdell, G. (1991) "Fiber Optic Sensors for Navy Applications", IEEE, LCS, 2:81–89.

Nielson, R. (1991) "Sonar Signal Processing", Artech Huse Inc., Chapter 2, p:51–59.

Krim A. and Viberg M. (1996) "Two Decades of Array Signal Processing Research", IEEE Signal Processing Magazine, p:67–94.

Kersey A. and Darkin, J., Editors (1992) SPIE vol. 1586, "Distributed and Multiplexed fiber Optic Sensors", p:1–243.

Nerby et al. "A cost effective technique for production well testing", (1995) Offshore Technology Conference, p:505–515.

* cited by examiner

APPARATUS FOR SENSING FLUID IN A PIPE

BACKGROUND OF THE INVENTION

1. Technical Field

This invention relates to fluid flow sensing devices that use fiber optics, and, more particularly, to those devices that measure the speed of sound, flow velocity, and other parameters of a fluid within a pipe using acoustic signals and local short duration pressure variations within the fluid.

2. Background Information

In the petroleum industry, there is considerable value in the ability to monitor the flow of petroleum products in the production pipe of a well in real time. Historically, fluid flow parameters such as the bulk velocity of a fluid have been sensed with venturi type devices directly disposed within the fluid flow. These devices have several drawbacks including the fact that they provide an undesirable flow impediment, are subject to the hostile environment within the pipe, and typically provide undesirable potential leak paths into or out of the pipe. In addition, these devices are only able to provide information relating to the bulk fluid flow and are therefore unable to provide information specific to constituents within a multi-phase fluid flow.

Some techniques utilize the speed of sound to determine various parameters of the fluid flow within a pipe. One technique measures the amount of time it takes for sound signals to travel back and forth between ultrasonic acoustic transmitters/receivers (transceivers). This is sometimes referred to as a "sing-around" or "transit time" method. U.S. Pat. Nos. 4,080,837, 4,114,439, and 5,115,670 disclose variations of this method. A disadvantage of this type of technique is that gas bubbles and/or particulates in the fluid can interfere with the signals traveling back and forth between the transceivers. Another disadvantage of this type of technique is that it considers only the fluid disposed between transceivers during the signal transit time. Fluid within a well is typically not homogenous. In other words, the fluid often contains localized concentration variations of water or oil, often referred to as "slugs". Localized concentration variations can affect the accuracy of the data collected.

Multiphase flow meters can be used to measure the flow rates of individual constituents within a fluid (e.g., a mixture of oil, gas, and water) without requiring separation of the constituents. Most of the multiphase flow meters that are currently available, however, are designed for use at the wellhead or platform. A problem with utilizing a flow meter at the wellhead of a multiple source well is that the fluid reaching the flow meter is a mixture of the fluids from the various sources, which are disposed at different positions within the well. So although the multiphase flow meter provides the advantage of providing information specific to individual constituents within a fluid (which is an improvement over bulk flow sensors), the information they provide is still limited because there is no way to distinguish from the various sources.

Acquiring reliable, accurate fluid flow data downhole at a particular source environment is a technical challenge for at least the following reasons. First, fluid flow within a production pipe is hostile to sensors in direct contact with the fluid flow. Fluids within the production pipe can erode, corrode, wear, and otherwise compromise sensors disposed in direct contact with the fluid flow. In addition, the hole or port through which the sensor makes direct contact, or through which a cable is run, is a potential leak site. There is great advantage in preventing fluid leakage out of the production pipe. Second, the environment within most wells is harsh, characterized by extreme temperatures, pressures, and debris. Extreme temperatures can disable and limit the life of electronic components. Sensors disposed outside of the production pipe may also be subject to environmental materials such as water (fresh or salt), steam, mud, sand, etc. Third, the well environment makes it difficult and expensive to access most sensors once they have been installed and positioned downhole.

What is needed, therefore, is a reliable, accurate, and compact apparatus for sensing fluid flow within a pipe in a non-intrusive manner that is operable in an environment characterized by extreme temperatures, pressures and the presence of debris. Further needed is a fluid sensing apparatus that can operate remotely and not likely to need replacement or recalibration once installed.

SUMMARY OF THE INVENTION

According to the present invention, an apparatus for non-intrusively sensing fluid flow within a pipe is provided. The apparatus includes a first sensing array for sensing acoustic signals traveling at the speed of sound through the fluid within the pipe, a second sensing array for sensing local pressure variations traveling with the fluid flow, and a housing attached to the pipe for enclosing the sensing arrays. The first acoustic sensing array includes a plurality of first fiber optic pressure sensors. The second flow velocity sensing array also includes a plurality of second fiber optic pressure sensors.

Optical power sent from a source connected to the apparatus travels into the first sensing array, which in turn produces a first signal relating to the acoustic signals. Likewise, optical power sent from the source travels into the second sensing array, which in turn produces a second signal relating to the local pressure variations within the fluid flow. The first and second signals are then processed and interpreted using known methods.

The function of each sensing array and the information gathered to perform that function is distinct from that of the other array. This can be clearly seen if one considers that the axial velocity of the fluid flow is small and therefore negligible compared to the speed of sound in the mixture (i.e., the speed of a compression wave traveling through the fluid within the pipe). The local pressure variations that are sensed by the second sensing array travel with the fluid flow, and are therefore at approximately the same axial velocity as the fluid flow. The local pressure variations have a small coherence length (sometimes referred to as "lengthscale") that typically lasts on the order of one to ten (1–10) pipe diameters. The acoustic signals that are sensed by the first sensing array, in contrast, are pressure variations that travel at the speed of sound through the fluid flow. The acoustic signals have a coherence length on the order of one hundred to ten thousand (100–10,000) pipe diameter lengths, which is orders of magnitude greater than that of the local pressure variations.

An advantage of the present invention apparatus is it enables the collection of flow data downhole within a well at or near the source of the fluid flow. As a result, accurate flow data can be collected from one or more sources individually, rather than data compiled from a mixture of those sources. Fluid flow data from the different sources enables the determination of the velocity and phase fraction of fluids flowing from each source.

Another advantage of the present invention is that it provides fluid flow data in a nonintrusive manner. The sensing arrays of the present invention attach to the outer surface of the pipe and therefore do not require an opening extending into the fluid flow path. As a result, a potential leak path into or out of the fluid flow path is eliminated and the sensing arrays are protected from the fluid flow within the pipe.

The present apparatus is also protected from the environment outside of the production pipe by a compactly formed housing that can easily be placed within the well casing. The housing protects the sensing arrays from the fluid and debris that enters the annulus between the production pipe and the well casing. As a result, the present invention can use a wider variety of sensing devices than would otherwise be possible. In addition, in the embodiment where the sensing arrays are disposed within a pressure vessel, the sensing arrays are disposed within a gas environment at a substantially constant pressure. The gaseous environment within the housing substantially isolates the sensing arrays from the acoustic environment outside of the housing. Hence, fluctuations in the pressure outside of the pressure vessel that might influence the sensing arrays are effectively attenuated. For all of these reasons, the reliability and durability of the sensing arrays are accordingly improved, and the need for a replacement or recalibration is reduced.

Other advantages of the present invention flow from the fact that it utilizes pressure sensing that is circumferentially averaged. Circumferential averaging helps to filter out non-axisymmetric pressure disturbances such as those associated with transverse pipe vibrations, flow noise, and higher dimensional acoustic oscillations as well as non-uniformities of the fluid flow through the cross-sectional area of the pipe. This attribute is useful for measuring propagating one-dimensional acoustic waves as well as long lengthscale vortical disturbances.

The foregoing and other objects, features, and advantages of the present invention will become more apparent in light of the following detailed description of exemplary embodiments thereof.

DETAILED DESCRIPTION OF THE INVENTION

Figure 1:
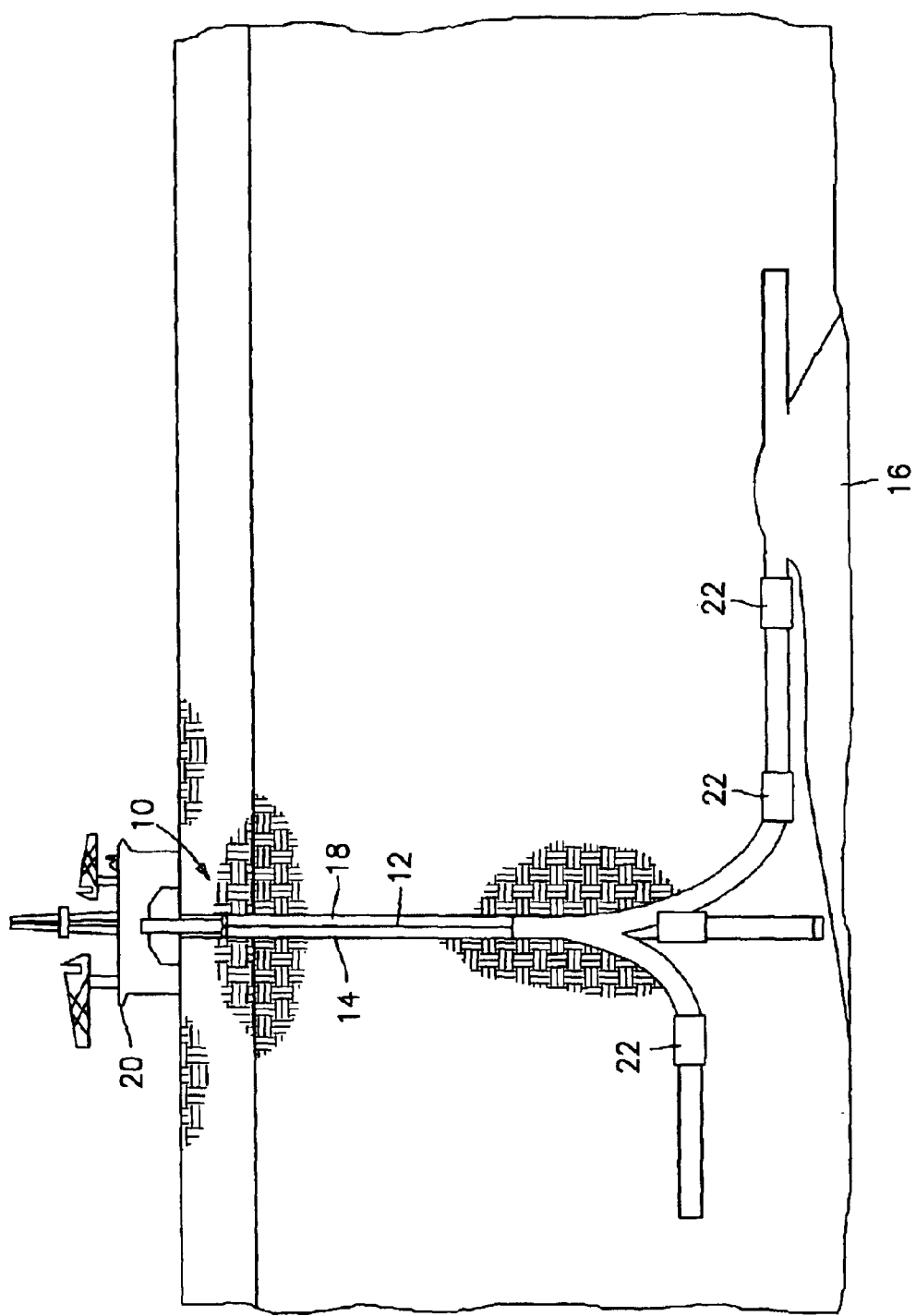
FIG. 1 is a diagrammatic view of a well having a casing and a pipe, with the flow meters of the present invention positioned at various locations along the pipe inside the casing.

Referring to FIG. 1 there is shown an intelligent oil well system 10 containing one or more production pipes 12 that extend downward through a casing 14 to one or more petroleum sources 16. An annulus 18 is formed between the pipe 12 and the casing 14. Each production pipe 12 may include one or more lateral sections that branch off to access different petroleum sources 16 or different areas of the same petroleum source 16. Fluid mixtures are pumped from the petroleum sources 16 to the platform 20 through the production pipes 12. The fluid mixtures consist predominantly of petroleum products and water. The production pipe 12 includes one or more of the present invention apparatus 22 for non-intrusively sensing fluid flow within a pipe (also referred to hereinafter as a "flow meter") to monitor various physical parameters of the fluid mixtures as they flow through the production pipes 12.

Figure 2:
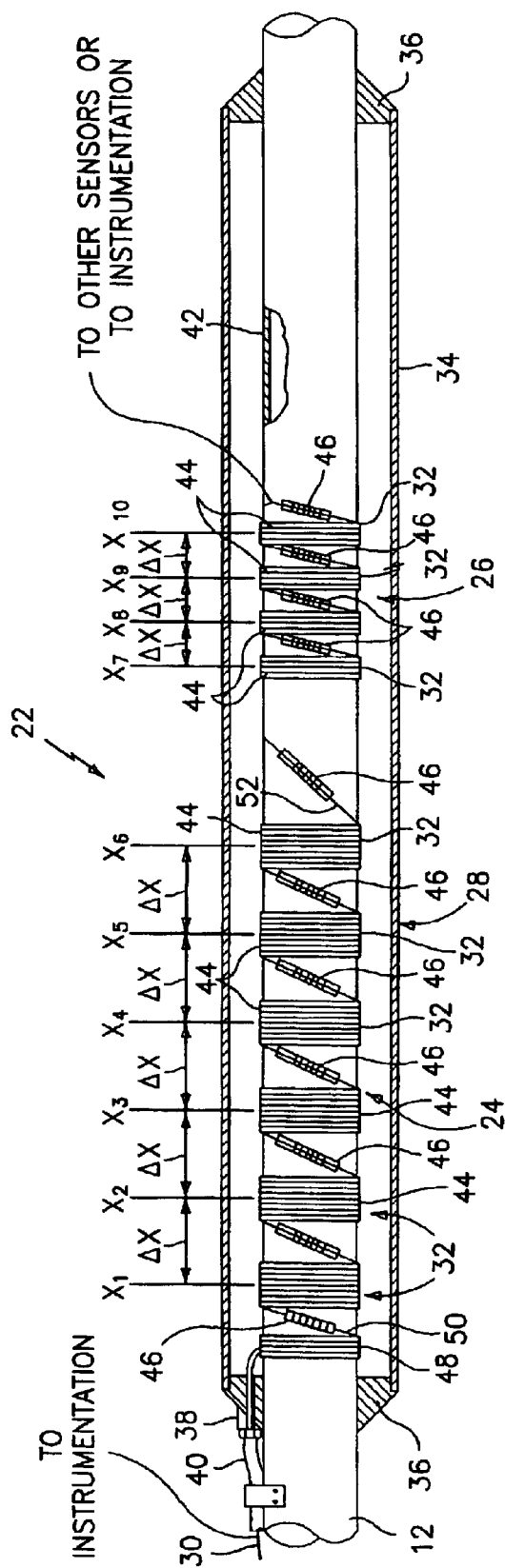
FIG. 2 is a diagrammatic view of an exemplary embodiment of the present invention apparatus for non-intrusively measuring fluid flow parameters within a pipe.

The flow meter 22, as shown in FIG. 2, includes a first sensing array 24 for sensing acoustic signals traveling at the speed of sound through the fluid within the pipe 12 (referred to as the "acoustic sensing array"), a second sensing array 26 for sensing short duration local pressure variations traveling with the fluid flow (referred to as the "flow velocity sensing array"), and a housing 28 attached to the pipe 12 for enclosing the sensing arrays 24, 26. Each flow meter 22 can be incorporated into an existing section of production pipe 12, or can be incorporated into a specific pipe section that is inserted into the line of the production pipe 12. The distributed scheme of flow meters 22 shown in FIG. 1 permits an operator of the intelligent well system 10 to determine the extent and location of breakthrough of water into the petroleum reserve. The availability of this type of information permits the user to monitor and intelligently control the production of the petroleum reserve.

Figure 3:
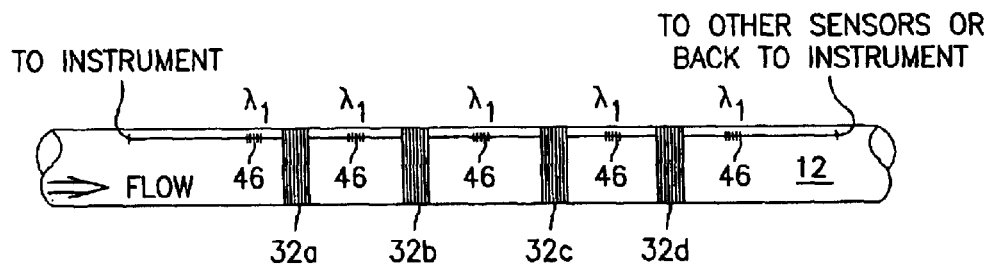
FIG. 3 is a diagrammatic view of an embodiment of a sensing device of the present invention.
Figure 4:
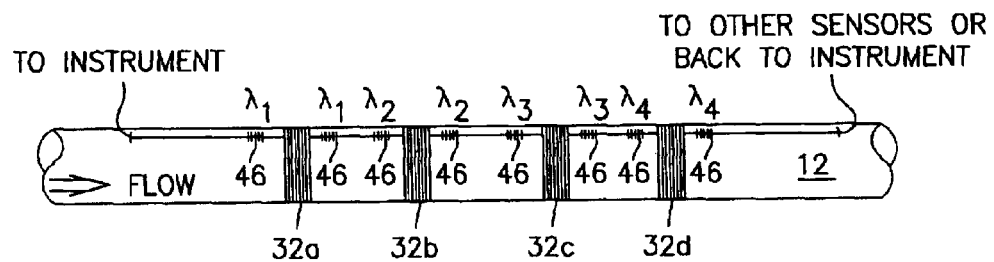
FIG. 4 is a diagrammatic view of an embodiment of a sensing device of the present invention.
Figure 5:
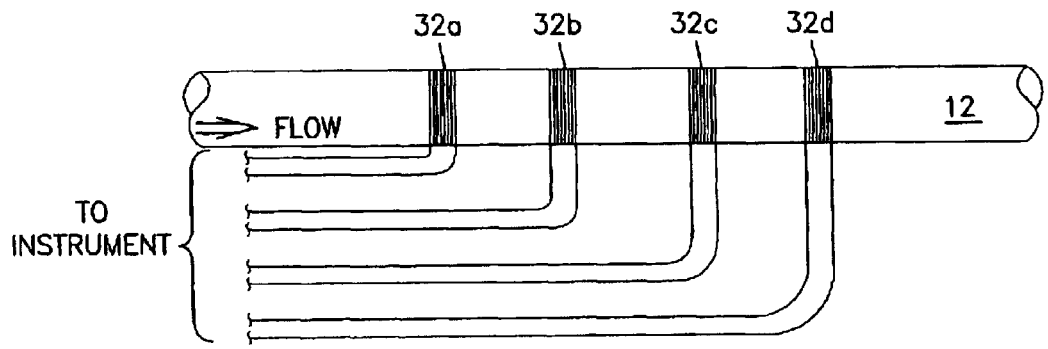
FIG. 5 is a diagrammatic view of an embodiment of a sensing device of the present invention.

The sensing arrays 24, 26 receive optical power and produce optical signals via fiber optic cables 30 that extend between the flow meter 22 and instrumentation (e.g., instrumentation such as, but not limited to, that disclosed in U.S. patent application Ser. No. 09/726,059, entitled "Method and Apparatus for Interrogating Fiber Optic Sensors," filed Nov. 29, 2000, which is hereby incorporated by reference) residing on the platform 20 or at a remote location in communication with the platform 20. Optical fiber pressure sensors 32 within each sensing array 24, 26 may be connected individually to the platform instrumentation, or may be multiplexed along one or more optical fibers using known techniques including, but not limited to, wavelength division multiplexing (WDM) and time division multiplexing (TDM). In those embodiments where the optical fiber pressure sensors 32 are not connected individually to the instrumentation, the sensors 32 of a sensing array 24, 26 may be connected to one another in series or parallel. The optical signals produced by the sensing arrays 24, 26 provide information relating to the fluid flow characteristics within the pipe 12 (e.g., local flow disturbances, acoustic wave propagation within the fluid, flow pressure magnitude and changes, etc.). Interpretation of the optical signals, which can be done using methods well known in the art, enables the determination of the speed of sound (SOS) of the fluid mixture and the velocity of the fluid flow within the pipe 12. Once the SOS, the flow velocity, the pressure, and the temperature of the mixture are known, other desirable data such as the phase fraction of the constituents within the mixture can be determined. The optical signals from the sensing arrays 24, 26 may also be interpreted using the methods disclosed in the following U.S. Patent Applications, but are not limited to being used therewith: U.S. patent applications Ser. No. 09/105,534, entitled "Fluid Parameter Measurement in Pipes Using Acoustic Pressures," filed Jun. 26, 1998; U.S. patent application Ser. No. 09/344,070, entitled "Measurement of Propagating Acoustic Waves in Compliant Pipes," filed Jun. 25, 1999; U.S. patent application Ser. No. 09/344,069, entitled "Displacement Based Pressure Sensor Measuring Unsteady Pressure in a Pipe," filed Jun. 25, 1999; U.S. patent application Ser. No. 09/344, 094, entitled "Fluid Parameter Measurement in Pipes Using Acoustic Pressures," filed Jun. 25, 1999; and U.S. patent application Ser. No. 09/344,093, entitled "Non-Intrusive Fiber Optic Pressure Sensor for Measuring Unsteady Pressures within a Pipe," filed Jun. 25, 1999; all of which are hereby incorporated by reference. FIG. 2 shows an exemplary embodiment of the present invention wherein the acoustic sensing array 24 and the flow velocity sensing array 26 are positioned adjacent to one another on a common length of pipe 12. Further details of this embodiment are provided below. FIGS. 3–5 diagrammatically illustrate sensing array embodiments and attributes that can be used with either or both sensing arrays 24, 26.

To avoid interference from outside sources and to protect from the harsh environment within the well, the sensing arrays 24, 26 are enclosed within a housing 28 that is attached to an exterior surface of the pipe section 12. The housing 28 includes an outer sleeve 34 extending between a pair of bosses 36. The fiber optic cable(s) 30 that extends between the flow meter 22 and the instrumentation passes through a sealable port 38 in one or both bosses 36 and connects with the sensing arrays 24, 26. Outside of the housing 28, the sensor cable 30 is housed in a protective conduit 40 that is attached to the pipe 12. In the preferred embodiment, the housing 28 and the pipe 12 together form a pressure vessel. The pressure within the pressure vessel may be greater than or less than the ambient pressure within the annulus 18 between the casing 14 and the pipe 12. In other embodiments, the housing 28 is sealed to protect the sensing arrays 24, 26, but the housing does not act as a pressure vessel. In all embodiments, the size and structure of the housing 28 are chosen to withstand the pressure gradients present in the well environment, to accommodate the size of the sensing arrays 24, 26, and to position the sensing arrays 24, 26 a distance away from the housing 28 such that heat transfer via the pipe 12 and/or the housing 28 is not deleterious for the application at hand. In a preferred embodiment, the housing 28 is filled with a gas such as, but not limited to, air, nitrogen, argon, etc. The gaseous environment within the housing 28 advantageously acts as an acoustic isolator that helps reduce pressure wave interference that might otherwise travel into the housing 28 from the annulus 18 and undesirably influence the sensing arrays 24, 26. The gaseous environment also thermally insulates the sensing arrays 24, 26.

In some applications, there is advantage in placing a plurality of bumpers within the housing to help maintain separation between the outer sleeve of the housing and the pipe. U.S. patent application Ser. No. 09/740,757, entitled "Apparatus For Protecting Sensors Within A Well Environment," filed on Nov. 29, 2000, discloses bumpers that can be used in this manner and is hereby incorporated by reference.

The pipe section 12 has a compliancy selected to suit the application at hand. The pipe 12 must have sufficient structural integrity to handle the pressure gradient across the pipe 12, and yet must also be able to deflect (i.e., change in circumference) by an amount that will yield useful information. The amount the pipe 12 will change in circumference for a given pressure distribution is determined by the thickness of the pipe wall 42 and the physical properties of the pipe material (e.g., modulus of elasticity, etc.). Thus, the thickness of the pipe wall 42 and the pipe material can be chosen to help produce favorable sensor sensitivity for the present apparatus. The characteristics of the pipe section 12 contiguous with the disclosed apparatuses may be the same as or different than the characteristics in other sections of the production pipe 12.

The optical pressure sensors 32 used in the acoustic and flow velocity sensing arrays 24, 26 each include a coil of optical fiber 44, or a plurality of optical fiber coils 44. Each coil 44 is wrapped one or more turns around the circumference of the pipe section 12 in a manner that allows the length of the optical fiber within the coil 44 to change in response to a change in the circumference of the pipe 12. If, for example, a pipe 12 can be expected to see a maximum circumferential change of "y", then a one-turn coil will be subject to a maximum potential change in length of "y" (or some known function of "y"). If an optical measurement technique is not sensitive enough to register a change in distance equal to "y", then the coil 44 can be wrapped to include "n" number of turns. The change in fiber length "y" per turn is therefore multiplied by "n" turns, and a change in fiber length great enough to produce a useful signal (i.e., "n·y") is provided. In fact, the same technique can be used to not only provide a minimum useful signal, but also to increase the sensitivity of the sensor 32 and therefore the range of detectable changes in the circumference of the pipe 12. In all cases, the length of the optical fiber in each coil 44 is known and is chosen to produce the sensitivity required to sense the disturbance(s) of interest for that particular sensor. The preferred embodiment, as described above, includes coils 44 wrapped around the circumference of the pipe 12. Alternatively, the optical fiber lengths can be arranged around a portion of the circumference of the pipe 12.

The turns of optical fiber in a sensor 32 are preferably laid next to one another to minimize the axial component of each turn, and thereby keep each turn to a known, constant length. Alternatively, some or all the turns of a coil 44 could be separated from adjacent turns. A coil 44 can consist of a single layer of optical fiber turns, or multiple layers of optical fiber turns depending on the application. The coil 44 of optical fiber in each sensor 32 may be attached to the pipe 12 by a variety of attachment mechanisms including, but not limited to, adhesive, glue, epoxy, or tape. In a preferred embodiment, a tape having an adhesive substance attached to opposite surfaces of a substrate is used. The tape adheres to both the pipe 12 and the fiber and provides a smooth surface on which the fiber can be laid. It is theorized that tape used on a rough surface helps to decrease micro-bend losses within the optical fiber.

In most embodiments, the optical pressure sensors 32 used in the acoustic and flow velocity sensing arrays 24, 26 further include one or more optical reflective devices 46 disposed between the coils 44 that are wavelength tunable. In a preferred embodiment, the optical reflective devices 46 are fiber Bragg gratings (FBGs). An FBG, as is known, reflects a predetermined wavelength band of light having a central peak reflection wavelength ($\lambda b$), and passes the remaining wavelengths of the incident light (within a predetermined wavelength range). Accordingly, input light propagates along the cable 30 to the coils 44 and the FBGs reflect particular wavelengths of light back along the cable 30. It is believed that in most applications there is advantage in placing an isolation pad between each optical reflective device and the outer surface of the pipe to accommodate pipe growth and/or vibrations. U.S. patent application Serial No. 09/726,060, entitled "Apparatus for Protecting Sensing Devices," filed Nov. 29, 2000, discloses such an isolation pad and is hereby incorporated by reference.

In the embodiment of the present invention shown in FIG. 3, the sensors 32 are connected in series and a single FBG 46 is used between each of the sensors 32, and each FBG 46 has a common reflection wavelength $\lambda_1$. In the embodiment shown in FIG. 4, the sensors 32 are connected in series and pairs of FBGs 46 are located along the fiber at each end of the sensors 32. The FBG pairs 46 are used to multiplex the sensed signals and to identify the individual sensors 32 from their respective optical return signals. The pair of FBGs 46 on each end of the first sensor 32a have a common reflection wavelength $\lambda_1$, and the second pair of FBGs 46 on each end of the second sensor 32b have a common reflection wavelength $\lambda_2$, but different from that of the first pair of FBGs 46. Similarly, the FBGs 46 on each end of the third sensor 32c have a common reflection wavelength $\lambda_3$, which is different from $\lambda_1$, $\lambda_2$, and the FBGs 46 on each end of the fourth sensor 32d have a common reflection wavelength $\lambda_4$, which is different from $\lambda_1$, $\lambda_2$, $\lambda_3$. The sensors 32 within either sensing array 24, 26 may alternatively be connected to one another in parallel by using optical couplers (not shown) that are positioned upstream of each sensor 32 and coupled to a common fiber.

Referring to FIGS. 2, 3, and 4, the sensors 32 which are separated by FBGs 46, may be configured in numerous known ways to precisely measure the fiber length or change in fiber length, such as by an interferometric, Fabry Perot, time-of-flight, or other known arrangements. An example of a Fabry Perot technique is described in U.S. Patent No. 4,950,883, entitled "Fiber Optic Sensor Arrangement Having Reflective Gratings Responsive to Particular Wavelengths," issued to Glenn. Alternatively, a portion or all of the fiber between the optical reflective device 46 may be doped with a rare earth dopant (such as erbium) to create a tunable fiber laser, examples of which can be found in U.S. Pat. Nos. 5,317,576, 5,513,913, and 5,564,832, which are incorporated herein by reference.

Referring to FIG. 5, in an alternative embodiment the sensors 32 may also be formed as a purely interferometric sensing array by using sensors 32 without FBGs 46. In this embodiment, each sensor 32 is independently connected to the instrumentation at the platform 20 and known interferometric techniques are then used to determine the length or change in length of the fiber around the pipe 12 due to pressure variations. U.S. Pat. No. 5,218,197, entitled "Method and Apparatus for the Non-Invasive Measurement of Pressure Inside Pipes Using a Fiber Optic Interferometer Sensor," issued to Carroll, discloses such a technique. The interferometric wraps may also be multiplexed in a manner similar to that described in Dandridge, et al., "Fiber Optic Sensors for Navy Applications," IEEE, Feb. 1991, or Dandridge, et al., "Multiplexed Interferometric Fiber Sensor Arrays," SPIE, Vol. 1586, 1991, pp. 176–183. Other techniques to determine the change in fiber length may also be used. In addition, reference optical coils (not shown) may be used for certain interferometric approaches and may also be located on or around the pipe 12 but may be designed to be insensitive to pressure variations.

Adjacent sensors 32, within either sensing array 24, 26, are spaced apart by a known distance or distances. The sensors 32 in an array are preferably equidistant from one another, but not necessarily. In both sensing arrays 24, 26 the spacing between adjacent sensors 32 and the number of sensors 32 reflect the nature of the disturbance being sensed. The acoustic sensing array 24 detects acoustic signals having relatively long wavelengths, and the flow velocity sensing array 26 detects local pressure variations within the fluid flow having a relatively small coherence length. In relative terms, the sensors 32 in the acoustic sensing array 24 are spaced apart from one another substantially further than are the sensors 32 within the flow velocity sensing array 26 because of the intrinsic differences in the pressure variations being sensed. The exact inter-spacing and number of coils 44 in a sensing array 24, 26 is application dependent and is a function of parameters such as, but not limited to, the spectra of anticipated acoustic signals and local pressure variations, the anticipated SOS of the fluid constituents, the number of sensors 32, and the processing technique used, etc. Examples of signal processing techniques can be found in the following references, which are incorporated herein by reference: H. Krim, M. Viberg, "Two Decades of Array Signal Processing Research-The Parametric Approach," IEEE Signal Processing Magazine, pp. 67–94, and R. Nielson, "Sonar Signal Processing," Ch. 2, pp. 51–59.

FIG. 2 shows an exemplary embodiment of the present invention flow meter 22 that can be inserted into the line of a production pipe 12 and disposed at an appropriate position within the well. The flow meter 22 includes an acoustic sensing array 24 and a flow velocity sensing array 26 mounted on a section of pipe 12 adjacent from one another and enclosed within a housing 28. A fiber optic cable 30 extends through one of the housing bosses 36 and connects to an optical delay line 48. An optical fiber 50, in turn, connects the optical delay line 48 to the acoustic sensing array 24. The acoustic sensing array 24 includes six (6) sensors 32 located at six predetermined locations ($X_1$, $X_2$, $X_3$, $X_4$, $X_5$, $X_6$) along the pipe 12, where each sensor 32 is separated from adjacent sensors 32 within the acoustic sensing array 24 by an axial length increment equal to "$\Delta x$". Each sensor is mounted on a tape that includes adhesive on both faces. An FBG 46 is positioned between the optical delay line 48 and the first sensor 32. One FBG 46 is also positioned between and connected to each pair of adjacent sensors 32, such that the optical delay line 48, the FBGs 46, and the sensors 32 in the acoustic sensing array 24 are in series with one another. It is preferred, but not required, to skew each FBG 46 between the adjacent sensors 32 so as to minimize the sharpness of the directional changes within the fiber of either sensor 32 or within the FBGs 46.

An optical fiber 52 extends from the last sensor 32 in the acoustic sensing array 24 over to a first sensor 32 in the adjacent flow velocity sensing array 26. An FBG 46 is disposed between the two arrays. The flow velocity sensing array 46 includes four (4) sensors 32 located at predetermined locations ($x_7$, $X_8$, $X_9$, $X_{10}$) along the pipe 12. Like the acoustic sensing array 24, each sensor 32 in the flow velocity sensing array 26 is mounted on tape and is separated from adjacent sensor 32 within the flow velocity sensing array 26 by an axial length increment equal to "$\Delta x$". The axial distance $\Delta x$ separating the sensors 32 in the flow velocity sensing array 26 is, however, substantially shorter than that used in the acoustic sensing array 24 because of the difference in the characteristics of the pressure disturbances to be measured. As noted previously, the acoustic sensing array 24 senses relatively long wavelength acoustic signals traveling through the fluid flow at the speed of sound, while the flow velocity sensing array 25 senses relatively short coherence length local pressure variations with the fluid flow. One FBG 46 is positioned between and connected to each pair of adjacent sensors 32, such that the FBGs 46 and the sensors 32 in the flow velocity sensing array 26 are in series with one another. Here again, it is preferred to skew each FBG 46 between the adjacent sensors 32 so as to minimize sharp changes within the fiber of either sensor 32 or within the FBGs 46. In some applications, it may be useful to connect an additional optical delay line 48 after the last sensor 32 within the flow velocity sensing array 26.

In a version of the exemplary embodiment of the present invention flow meter 22 shown in FIG. 2, the optical delay line(s) 48 are formed by wrapping approximately two hundred and ten meters (210 m) of optical fiber around the circumference of a three and one-half inch (3.5") diameter pipe. Each coil 44 of the acoustic sensing array 24 is formed by wrapping one hundred and two meters (102 m) of optical fiber around the circumference of the pipe in a single layer. The optical fiber is wrapped using approximately twenty-five grams (25 g) of tension on the fiber. Each turn of the coil 44 is separated from adjacent coils by a fifteen micron (15 μ) gap. Adjacent coils 44 in the acoustic sensing array are spaced approximately eighteen inches (18") apart, center to center. The velocity sensing array is formed in like manner, except that each coil 44 comprises seven layers rather than a single layer, and adjacent coils 44 are spaced approximately one and eight tenths of an inch (1.8") apart, center to center. In both sensing arrays, the FBGs are spliced in the section of optical fiber that extends in a helical fashion between adjacent coils 44, or between a coil 44 and a delay line, etc. Each FBG and the splices that tie the FBG into the optical fiber are laid on an isolator pad, as previously noted.

Although the invention has been described and illustrated with respect to exemplary embodiments thereof, the foregoing and various other additions and omissions may be made therein and thereto without departing from the spirit and scope of the present invention. For example, the present apparatus has been described as being mounted on a cylindrical pipe 12. The present apparatus is not limited to cylindrical conduits, and can be used with conduits having alternative cross-sectional geometries. The Detailed Description also describes the present apparatus as being used within a well enviromnent with the sensing arrays 24, 26 deployed together. Although the present apparatus has particular utility in a well enviromnent, it can be used to measure fluid flow in a pipe 12 in a variety of applications and is therefore not limited to a well application. Likewise, there is no requirement that the acoustic sensing array 24 and the flow velocity sensing arrays 26 must be utilized together, and each can be used individually to suit the application.

What is claimed is:

1. An apparatus for sensing fluid flow within a pipe comprising:
   an acoustic sensing device for providing an acoustic signal indicative of the speed of sound in the fluid flowing within the pipe, wherein the acoustic sensing device is attached to the outside wall of the pipe; and
   a flow velocity sensing device coupled to the acoustic device comprising an array of sensors for providing signals indicative of pressure variations in the fluid that travel at approximately a same velocity as the fluid, wherein the flow velocity sensing device is attached to the outside wall of the pipe.

2. The apparatus of claim 1, further comprising an optical source optically connected to the apparatus for providing optical power to the acoustic sensing device and the flow velocity sensing device.

3. The apparatus of claim 1, further comprising a housing attached to the pipe for enclosing the sensing devices.

4. The apparatus of claim 3, wherein the housing comprises a pressure vessel.

5. The apparatus of claim 3, wherein the housing is filled with air, nitrogen, or argon.

6. The apparatus of claim 1 wherein the pipe is sufficiently compliant so that the sensing devices may sense the speed of sound in the fluid and the speed of the fluid through the wall of the pipe.

7. The apparatus of claim 1, wherein the acoustic sensing device comprises a plurality of sensors.

8. The apparatus of claim 7, wherein the sensors are spaced equidistantly apart.

9. The apparatus of claim 7, wherein the sensors are spaced to sense acoustic pressure variations traveling at the speed of sound in the fluid.

10. The apparatus of claim 7, wherein the sensors comprise optical fiber sensors.

11. The apparatus of claim 10, wherein each sensor comprises at least one coil of optical fiber wrapped around the circumference of the pipe.

12. The apparatus of claim 11, wherein each sensor is separated by at least one fiber Bragg grating.

13. The apparatus of claim 1, wherein the array of sensors of flow velocity sensing device comprises a plurality of sensors spaced equidistantly apart.

14. The apparatus of claim 13, wherein the sensors are spaced to sense local pressure variations traveling with the fluid in the pipe.

15. The apparatus of claim 13, wherein the sensors comprise optical fiber sensors.

16. The apparatus of claim 15, wherein each sensor comprises at least one coil of optical fiber wrapped around the circumference of the pipe.

17. The apparatus of claim 16, wherein each sensor is separated by at least one fiber Bragg grating.

18. The apparatus of claim 1, wherein the acoustic sensing device and the flow velocity sensing device are coupled by a fiber optic cable.

19. The apparatus of claim 1, wherein the acoustic sensing device and the flow velocity sensing device are multiplexed along a common fiber optic cable.

20. An apparatus for sensing fluid flow comprising:
    a housing;
    an acoustic sensing device within the housing to sense acoustic pressure variations traveling at the speed of sound in fluid flowing through the housing, the acoustic sensing device providing an optical signal indicative of the speed of sound in the fluid; and
    a flow velocity sensing device within the housing comprising an array of sensors to provide signals indicative of local pressure variations in the fluid that travel with the fluid.

21. The apparatus of claim 20, further comprising an optical source optically connected to the apparatus for providing optical power to the acoustic sensing device arid the flow velocity sensing device.

22. The apparatus of claim 20, wherein the housing is adapted to attach in line with the pipe.

23. The apparatus of claim 20, wherein the housing comprises a pressure vessel.

24. The apparatus of claim 20, wherein the housing is filled with air, nitrogen, or argon.

25. The apparatus of claim 20, wherein the pipe is sufficiently compliant so that the sensing devices may sense the acoustic pressure variations and the local pressure variations through the wall of the pipe.

26. The apparatus of claim 20, wherein the acoustic sensing device comprises a plurality of sensors.

27. The apparatus of claim 26, wherein the sensors are spaced equidistantly apart.

28. The apparatus of claim 26, wherein the sensors are spaced to sense acoustic pressure variations traveling at the speed of sound in the fluid.

29. The apparatus of claim 26, wherein the sensors compose optical fiber sensors.

30. The apparatus of claim 29, wherein each sensor comprises at least one coil of optical fiber wrapped around the circumference of the pipe.

31. The apparatus of claim 30, wherein each sensor is separated by at least one fiber Bragg grating.

32. The apparatus of claim 20, wherein the array of sensors of the flow velocity sensing device comprises a plurality of sensors spaced equidistantly apart.

33. The apparatus of claim 32, wherein the sensors are spaced to sense local pressure variations traveling with the fluid in the pipe.

34. The apparatus of claim 32, wherein the sensors comprise optical fiber sensors.

35. The apparatus of claim 34, wherein each sensor comprises at least one coil of optical fiber wrapped around the circumference of the pipe.

36. The apparatus of claim 35, wherein each sensor is separated by at least one fiber Bragg grating.

37. The apparatus of claim 20, wherein the acoustic sensing device and the flow velocity sensing device are coupled by a fiber optic cable.

38. The apparatus of claim 20, wherein the acoustic sensing device and the flow velocity sensing device are multiplexed along a common fiber optic cable.

* * * * *